United States Patent
Safai et al.

(10) Patent No.: US 9,715,613 B2
(45) Date of Patent: Jul. 25, 2017

(54) SYSTEMS AND METHODS FOR USE IN AUTHENTICATING AN OBJECT

(71) Applicant: The Boeing Company, Seal Beach, CA (US)

(72) Inventors: Morteza Safai, Newcastle, WA (US); Dallas Steven Scholes, Buckley, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 14/268,569

(22) Filed: May 2, 2014

(65) Prior Publication Data

US 2015/0317501 A1 Nov. 5, 2015

(51) Int. Cl.
*G06K 7/10* (2006.01)
*G06K 17/00* (2006.01)

(52) U.S. Cl.
CPC ....... *G06K 7/1099* (2013.01); *G06K 7/10366* (2013.01); *G06K 2017/0064* (2013.01)

(58) Field of Classification Search
CPC ............. G06K 7/1099; G06K 7/10366; G06K 2017/0064
USPC ..... 340/10.1, 10.4, 10.42, 572.1–572.8, 10.3
See application file for complete search history.

(56) References Cited

U.S. PATENT DOCUMENTS

| | | | |
|---|---|---|---|
| 7,463,714 B2 | 12/2008 | Edwards et al. | |
| 7,508,910 B2 | 3/2009 | Safai et al. | |
| 2004/0138535 A1* | 7/2004 | Ogilvie | G07C 9/00111 600/300 |
| 2004/0247080 A1* | 12/2004 | Feda | G01N 23/223 378/101 |
| 2005/0073414 A1* | 4/2005 | Spahn | G01T 1/2018 340/571 |
| 2007/0132592 A1* | 6/2007 | Stewart | G06K 19/0723 340/572.8 |
| 2009/0128299 A1* | 5/2009 | Kirmeier | G06K 19/0672 340/10.1 |
| 2009/0224889 A1* | 9/2009 | Aggarwal | G06F 19/323 340/10.4 |

(Continued)

OTHER PUBLICATIONS

Korane, Kenneth J., Stopping the Flow of Counterfeit Components, Machine Design, Jul. 31, 2009, 6 pages; http://machinedesign.com/archive/stopping-flow-counterfeit-component last visited Apr. 24, 2014.

*Primary Examiner* — Brian Wilson
(74) *Attorney, Agent, or Firm* — Armstrong Teasdale LLP

(57) ABSTRACT

A system for use in authenticating an object is provided. The system includes a radio-frequency identification tag coupled to the object and an interrogation system. The interrogation system includes a backscatter x-ray source configured to discharge backscatter x-ray beams towards the object. The backscatter x-ray source is calibrated such that the backscatter x-ray beams cause the radio-frequency identification tag to emit a signal. The system also includes a radio-frequency detector configured to receive the signal from the radio-frequency identification tag and a computing device in communication with the radio-frequency detector. The computing device is configured to obtain first identifying information of the object from the signal and authenticate the object from the first identifying information.

16 Claims, 6 Drawing Sheets

(56) References Cited

U.S. PATENT DOCUMENTS

2010/0207741 A1\* 8/2010 Gudmundson ........ G06Q 10/08
340/10.42

\* cited by examiner

SYSTEMS AND METHODS FOR USE IN AUTHENTICATING AN OBJECT

BACKGROUND

The field of the present disclosure relates generally to radio-frequency identification (RFID) systems and, more specifically, to systems and methods of authenticating an object utilizing backscatter x-ray activated RFID systems.

RFID is a technology based on the use of small radio tags or transponders and readers/encoders that can be used to identify, track, and/or manage a wide range of objects. Known RFID tags, which contain a unique code together with other additional information, can be read by the reader/encoder from a distance without contact or line-of-sight. Typical RFID systems are categorized as either active or passive. Active RFID tags are typically powered by an internal battery and may include read/write functionality (i.e., tag data can be rewritten and/or modified). In a typical active RFID system, the RFID tag periodically transmits data, such as a serial number and/or location, to a central tracking database. Passive RFID tags operate without an internal power source. The passive RFID tags typically obtain operating power from the electromagnetic transmissions generated by the reader.

At least some known RFID systems are used to track and/or manage objects as they travel along a supply chain. Such RFID systems can include a variety of security systems to discourage tampering thereof, and to ensure the RFID systems remain associated with the correct objects. However, known RFID systems may be cost prohibitive for some manufacturers such that counterfeit objects (i.e., parts and/or components) may be introduced somewhere along the supply chain. Manufacturing a product with counterfeit objects that do not meet predetermined specifications may result in premature failure and/or malfunction of the product. Manually inspecting potentially counterfeit objects is a costly and laborious task. Moreover, it's difficult to inspect assemblies that include potentially counterfeit objects installed therein.

BRIEF DESCRIPTION

In one aspect, a system for use in authenticating an object is provided. The system includes a radio-frequency identification tag coupled to the object and an interrogation system. The interrogation system includes a backscatter x-ray source configured to discharge backscatter x-ray beams towards the object. The backscatter x-ray source is calibrated such that the backscatter x-ray beams cause the radio-frequency identification tag to emit a signal. The system also includes a radio-frequency detector configured to receive the signal from the radio-frequency identification tag and a computing device in communication with the radio-frequency detector. The computing device is configured to obtain first identifying information of the object from the signal and authenticate the object from the first identifying information.

In another aspect, a system for use in interrogating a radio-frequency identification tag coupled to an object is provided. The system includes a backscatter x-ray source configured to discharge backscatter x-ray beams towards the object. The backscatter x-ray source is calibrated such that the backscatter x-ray beams cause the radio-frequency identification tag to emit a signal. The system also includes a radio-frequency detector configured to receive the signal from the radio-frequency identification tag and a computing device in communication with the radio-frequency detector. The computing device is configured to obtain first identifying information of the object from the signal and authenticate the object from the first identifying information.

In another aspect, a method of authenticating an object having a radio-frequency identification tag coupled thereto. The method includes discharging backscatter x-ray beams towards the object, wherein the backscatter x-ray beams cause the radio-frequency identification tag to emit a signal. The method also includes receiving the signal from the radio-frequency identification tag, obtaining first identifying information for the object from the signal, and authenticating the object from the first identifying information.

In yet another aspect, a radio-frequency identification tag for use in coupling to an object is provided. The radio-frequency identification tag includes an x-ray receptor configured to receive backscatter x-ray beams that facilitate powering the radio-frequency identification tag, and a radio-frequency emitter coupled in communication with the x-ray receptor. The radio-frequency emitter is configured to emit a signal when the x-ray receptor receives backscatter x-ray beams having predetermined characteristics.

DETAILED DESCRIPTION

The implementations described herein relate to systems and methods of authenticating objects, such as those in a supply chain. Specifically, described herein is a multi-faceted security system that is substantially tamper-proof, and that facilitates restricting introduction of counterfeit objects, such as into the supply chain. In the exemplary implementation, the system includes a radio-frequency identification (RFID) tag coupled to each object and an interrogation system that analyzes the object and/or the RFID tag to determine the object's authenticity. The RFID tag is a passive RFID tag that utilizes energy provided by backscatter x-ray beams, which enables the RFID tags to be manufactured in increasingly small sizes relative to conventional RFID tags. As such, the RFID tags are sized to be coupled externally to and/or embedded within the objects, sized to be coupled to multiple components within a single object, and/or sized to restrict uncoupling of the RFID tags from the object without damaging the RFID tags.

The systems described herein implement one or more of the following security features to facilitate determining an object's authenticity. The security features include a) predetermined characteristics of backscatter x-ray beams required to actuate respective RFID tags that are initially only known to a manufacturer of the object and/or associated RFID tag; b) an encoded signal emitted by the RFID tag when actuated by the backscatter x-ray beams; c) a unique algorithm associated with the encoded signal for use in decoding the encoded signal to obtain first identifying information of the object therefrom; d) second identifying information for the object obtained from a backscattered x-ray image of the object; e) third identifying information for the object stored in a secure database; and f) a computing device that ensures at least two of the first, second, and/or third identifying information are aligned. As such, a technical effect of the systems and methods described herein is to ensure counterfeit objects that do not meet predetermined design specifications, for example, are identified and removed from the supply chain.

Figure 1:
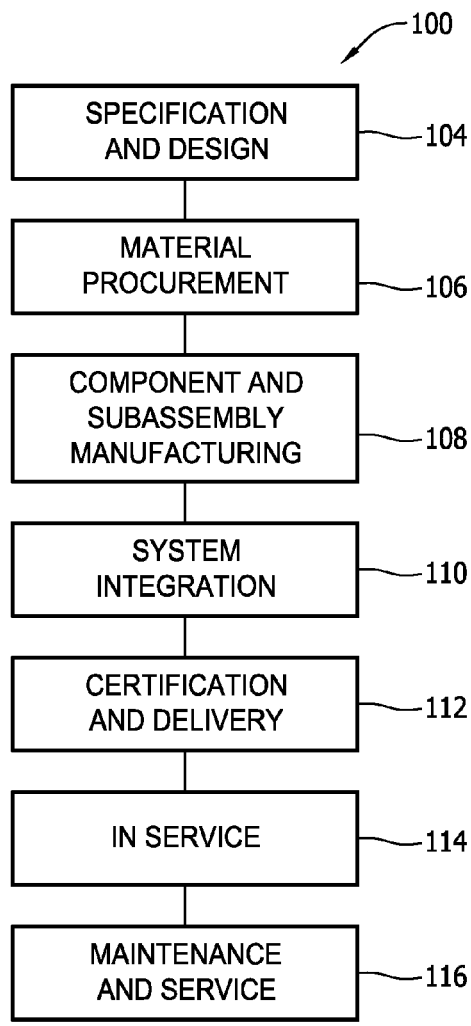
FIG. 1 is a flow diagram of an exemplary aircraft production and service method.
Figure 2:
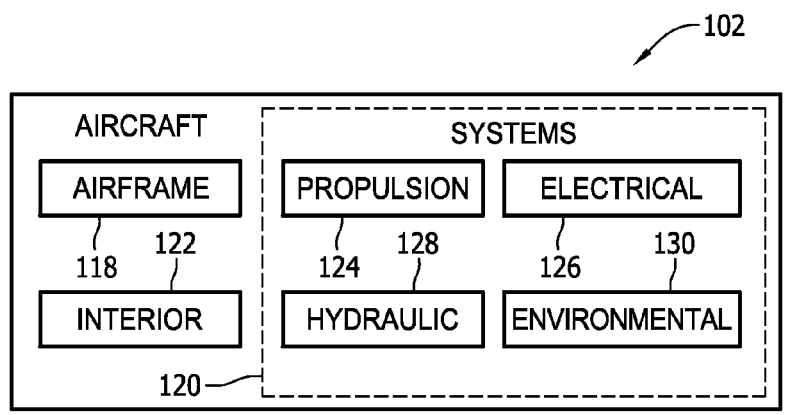
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
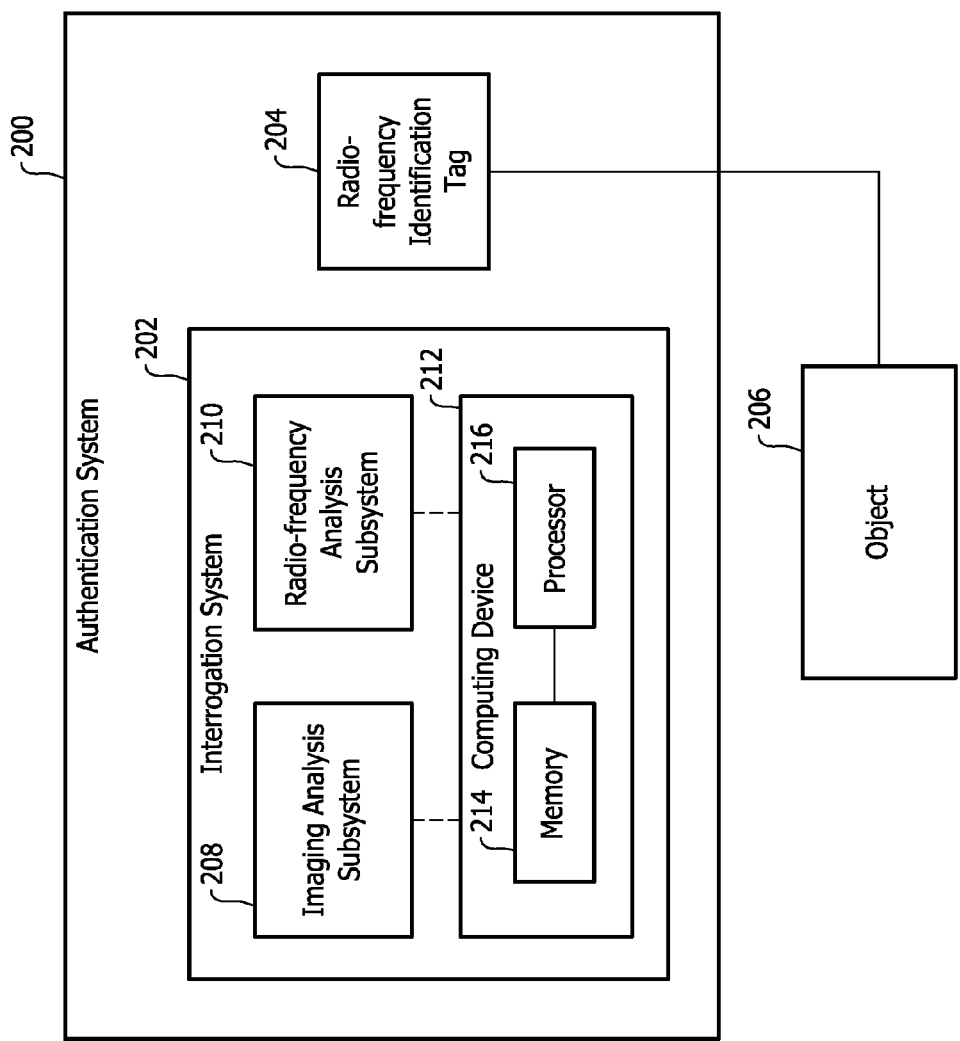
FIG. 3 is a block diagram of an exemplary authentication system.

FIG. 3 is a block diagram of an exemplary authentication system 200. In the exemplary implementation, authentication system 200 includes an interrogation system 202 and a radio-frequency identification (RFID) tag 204 coupled to an object 206. Interrogation system 202 initiates an analysis of RFID tag 204 and/or object 206 to facilitate authenticating object 206. Specifically, interrogation system 202 includes an imaging analysis subsystem 208, a radio-frequency (RF) analysis subsystem 210, and a computing device 212 coupled in communication with subsystems 208 and 210. As will be explained in more detail below, authentication system 200 utilizes at least subsystems 208 and/or 210 to form a multi-faceted and substantially tamper-proof system for authenticating object 206.

Computing device 212 includes a memory 214 and a processor 216 coupled to memory 214 for executing programmed instructions. Processor 216 may include one or more processing units (e.g., in a multi-core configuration) and/or include a cryptographic accelerator (not shown). Computing device 212 is programmable to perform one or more operations described herein by programming memory 214 and/or processor 216. For example, processor 216 may be programmed by encoding an operation as executable instructions and providing the executable instructions in memory 214.

Processor 216 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 216, cause processor 216 to perform at least a portion of the functions described herein. The above examples are exemplary only, and thus are not intended to limit in any way the definition and/or meaning of the term processor.

Memory 214 is one or more devices that enable information such as executable instructions and/or other data to be stored and retrieved. Memory 214 may include one or more computer-readable media, such as, without limitation, dynamic random access memory (DRAM), synchronous dynamic random access memory (SDRAM), static random access memory (SRAM), a solid state disk, and/or a hard disk. Memory 214 may be configured to store, without limitation, executable instructions, operating systems, applications, resources, installation scripts and/or any other type of data suitable for use with the methods and systems described herein.

Instructions for operating systems and applications are located in a functional form on non-transitory memory 214 for execution by processor 216 to perform one or more of the processes described herein. These instructions in the different implementations may be embodied on different physical or tangible computer-readable media, such as memory 214 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC) memory, and micro-drive memory. The computer-readable media may be selectively insertable and/or removable from computing device 212 to permit access and/or execution by processor 216. In an alternative implementation, the computer-readable media is not removable.

Figure 4:
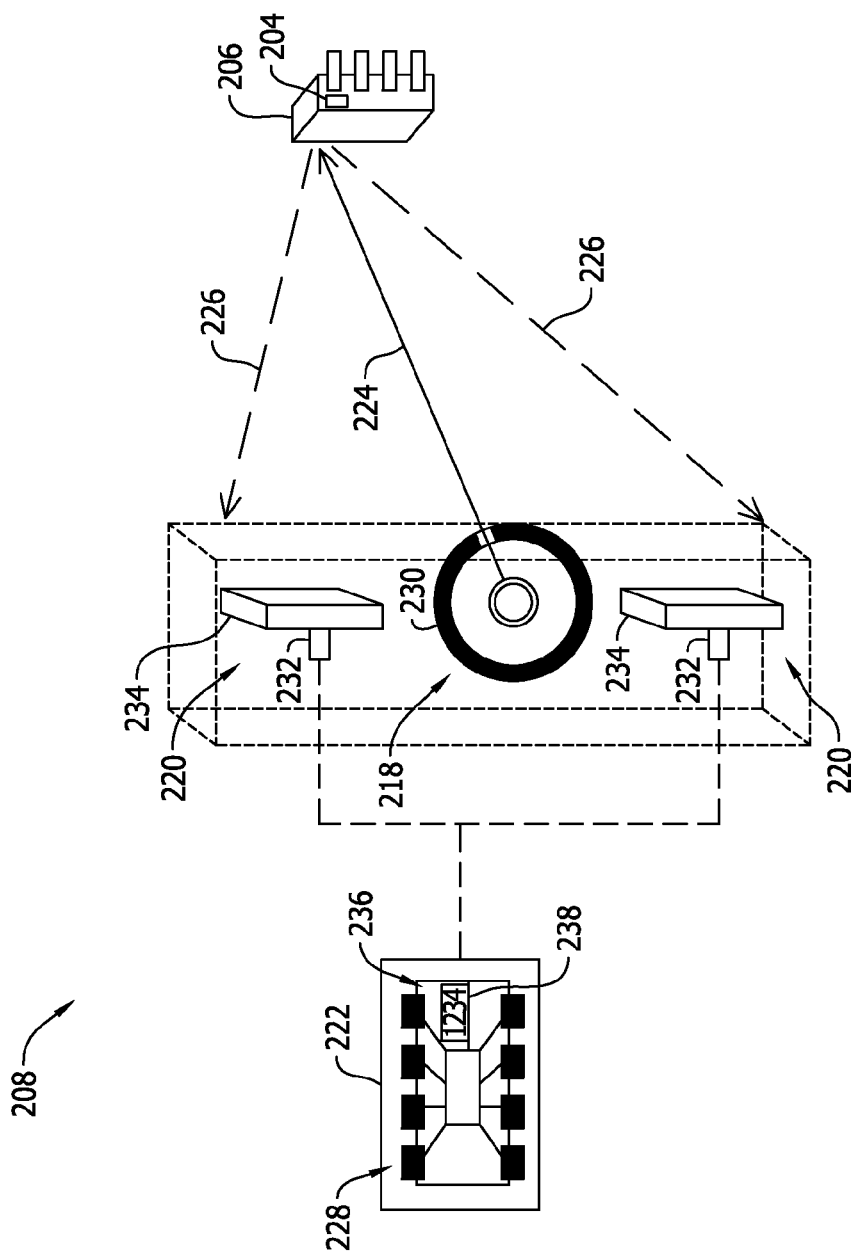
FIG. 4 is a schematic illustration of an exemplary imaging analysis subsystem that may be used with the authentication system shown in FIG. 3.

FIG. 4 is a schematic illustration of imaging analysis subsystem 208 that may be used with authentication system 200 (shown in FIG. 3). In the exemplary implementation, imaging analysis subsystem 208 includes a backscatter x-ray source 218, an x-ray detector 220, and a display 222 coupled in communication with x-ray detector 220. Backscatter x-ray source 218 discharges backscatter x-ray beams 224 towards object 206, and x-ray detector 220 receives reflected x-ray beams 226 to facilitate forming an image 228 of object 206 to be shown on display 222. Backscatter x-ray source 218 includes a rotating anode x-ray tube 230, and x-ray detector 220 includes photomultiplier tubes 232 coupled to first scintillators 234. Specifically, first scintillators 234 convert energy from reflected x-ray beams 226 into visible light, and photons (not shown) from the visible light are detected by photomultiplier tubes 232 and analyzed to form image 228. Alternatively, imaging analysis subsystem 208 may implement any imaging technique that enables authentication system 200 to function as described herein.

In operation, backscatter x-ray source 218 is calibrated to operate using predetermined settings such that backscatter x-ray beams 224 cause RFID tag 204 to emit a radio-frequency signal (not shown in FIG. 4). The radio-frequency signal may be emitted at any frequency along the radio spectrum that enables authentication system 200 to function as described herein. For example, in some implementations, the radio-frequency signal is emitted in the super high frequency (SHF) radio band to enable RFID tag 204 to be manufactured in increasingly small sizes.

Backscatter x-ray source 218 is calibrated such that backscatter x-ray beams 224 discharged therefrom have predetermined characteristics including at least one of a predetermined current flow, a predetermined energy level, a predetermined velocity, and/or a predetermined penetration angle relative to object 206. In some implementations, the predetermined settings are selected based on information not stored within interrogation system 202. For the example, the predetermined settings may be received from a third party, such as a manufacturer of object 206, that stores the predetermined settings in a secure location (not shown). Moreover, the predetermined settings remain secure by only being provided to legitimate entities (not shown) attempting to authenticate object 206. The predetermined settings may be linked with object 206 during manufacture thereof such that RFID tag 204 only emits the radio-frequency signal therefrom when actuated by backscatter x-ray beams 224 having the predetermined characteristics. If backscatter x-ray beams 224 discharged from x-ray source 218 having the predetermined characteristics do not actuate RFID tag 204, object 206 is designated as "counterfeit" and removed from the supply chain.

Moreover, discharging backscatter x-ray beams 224 towards object 206 facilitates obtaining first identifying information 236 of object 206 from image 228. More specifically, discharging backscatter x-ray beams 224 towards object 206 facilitates simultaneously actuating RFID tag 204 and generating image 228. In some implementations, first identifying information 236 is unique to object 206 and includes a first serial number 238 either imprinted on and/or embedded within object 206. As such, first identifying information 236 obtained from image 228 can be compared to other sources of identifying information for object 206, such as identifying information from the radio-frequency signal, to authenticate object 206. Alternatively, the identifying information may be any identifying information that enables authentication system 200 to function as described herein.

Figure 5:
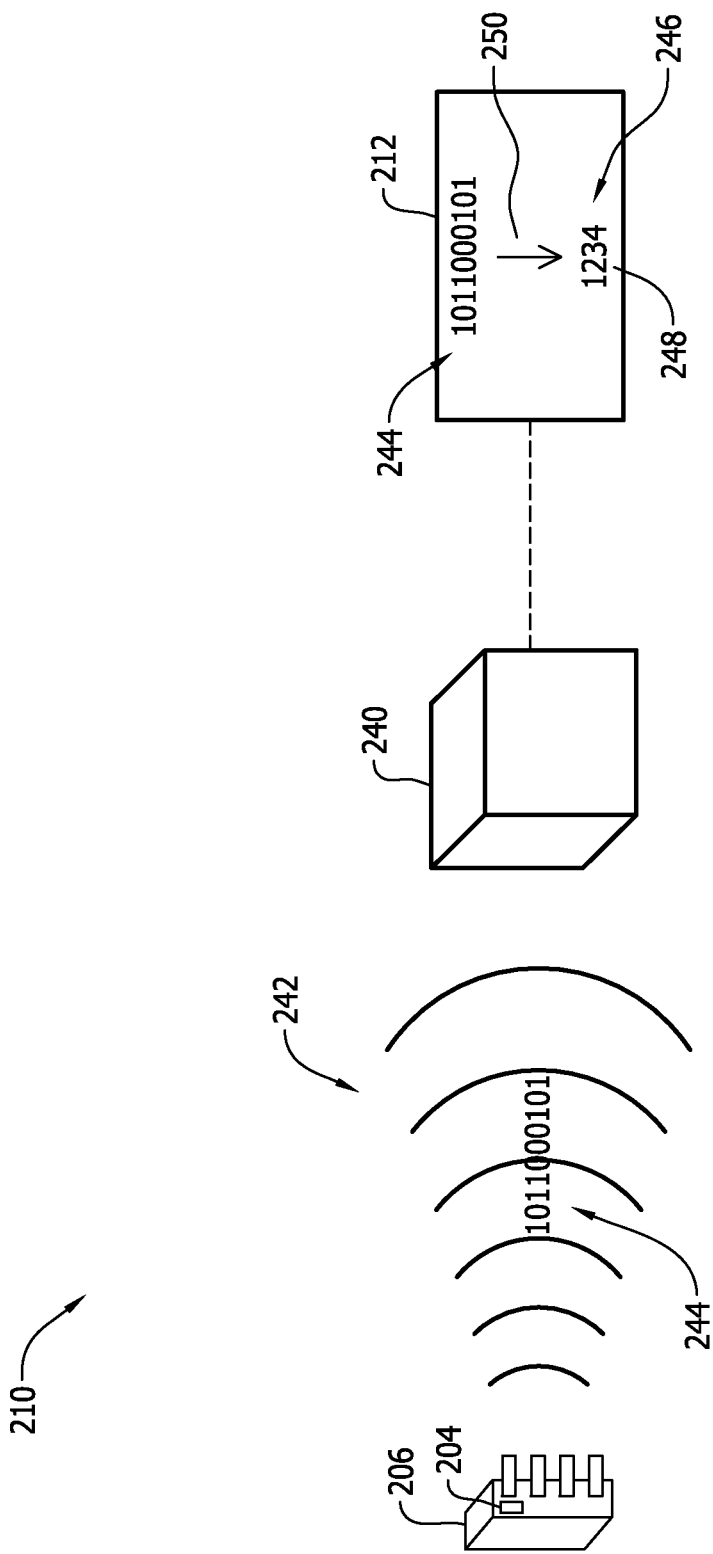
FIG. 5 is a schematic illustration of an exemplary radio-frequency analysis subsystem that may be used with the authentication system shown in FIG. 3.

FIG. 5 is a schematic illustration of RF analysis subsystem 210 that may be used with authentication system 200 (shown in FIG. 3). In the exemplary implementation, RF analysis subsystem 210 includes a radio-frequency (RF) detector 240 that receives a radio-frequency signal 242 from RFID tag 204 upon actuation thereof by imaging analysis subsystem 208 (shown in FIG. 4). RF signal 242 includes an encoded portion 244 containing second identifying information 246, such as a second serial number 248, unique to object 206. Specifically, RF detector 240 is coupled in communication with computing device 212, which decodes encoded portion 244 to facilitate obtaining second identifying information 246 from RF signal 242. In an alternative implementation, second identifying information 246 is contained within an unencoded portion (not shown) of RF signal 242.

In operation, RF detector 240 receives RF signal 242 and transmits RF signal 242 to computing device 212. Computing device 212 implements an algorithm 250 to facilitate decoding encoded portion 244 of RF signal 242. In some implementations, computing device 212 receives algorithm 250 from a third party (not shown), such as a manufacturer of object 206, and is stored in memory 214 (shown in FIG. 3). Algorithm 250 is linked with object 206 and/or encoded portion 244 of RF signal 242 during manufacture of object 206. As such, when interrogating a plurality of objects 206, computing device 212 utilizes a unique algorithm 250 associated with the object being analyzed to obtain second identifying information 246 therefrom. Moreover, interrogation system 202 can analyze a plurality of object 206 either simultaneously or successively.

If interrogation system 202 successfully decodes encoded portion 244 of RF signal 242, second identifying information 246 obtained from RF signal 242 is utilized to authenticate object 206. Specifically, second identifying information 246 is compared to other sources of identifying information for object 206, such as first identifying information 236 (shown in FIG. 4). If interrogation system 202 is unable to decode encoded portion 244 of RF signal 242 using the associated and unique algorithm 250, object 206 is designated as "counterfeit" and removed from the supply chain. In an alternative implementation, any form of encryption may be used to encode and/or decode RF signal 242 that enables authentication system 200 to function as described herein.

In some implementations, computing device 212 obtains third identifying information (not shown) from look-up data (not shown) stored in a secure database (not shown), such as memory 214 of computing device 212. The third identifying information is unique to each object 206 and is extracted from the secure database for comparison to the other sources of identifying information. After interrogation system 202 completes its analysis of RFID tag 204 and/or object 206, computing device 212 compares the multiple sources of identifying information to facilitate authenticating object 206. In one implementation, at least two of the first, second, and third identifying information must match for object 206 to be considered authentic. For example, computing device 212 compares second identifying information 246 to first identifying information 236, and/or compares second identifying information 246 to the third identifying information to facilitate authenticating object 206. In an alternative implementation, the third identifying information is stored remotely from authentication system 200, and is selectively provided to computing device 212 for comparison purposes.

Figure 6:
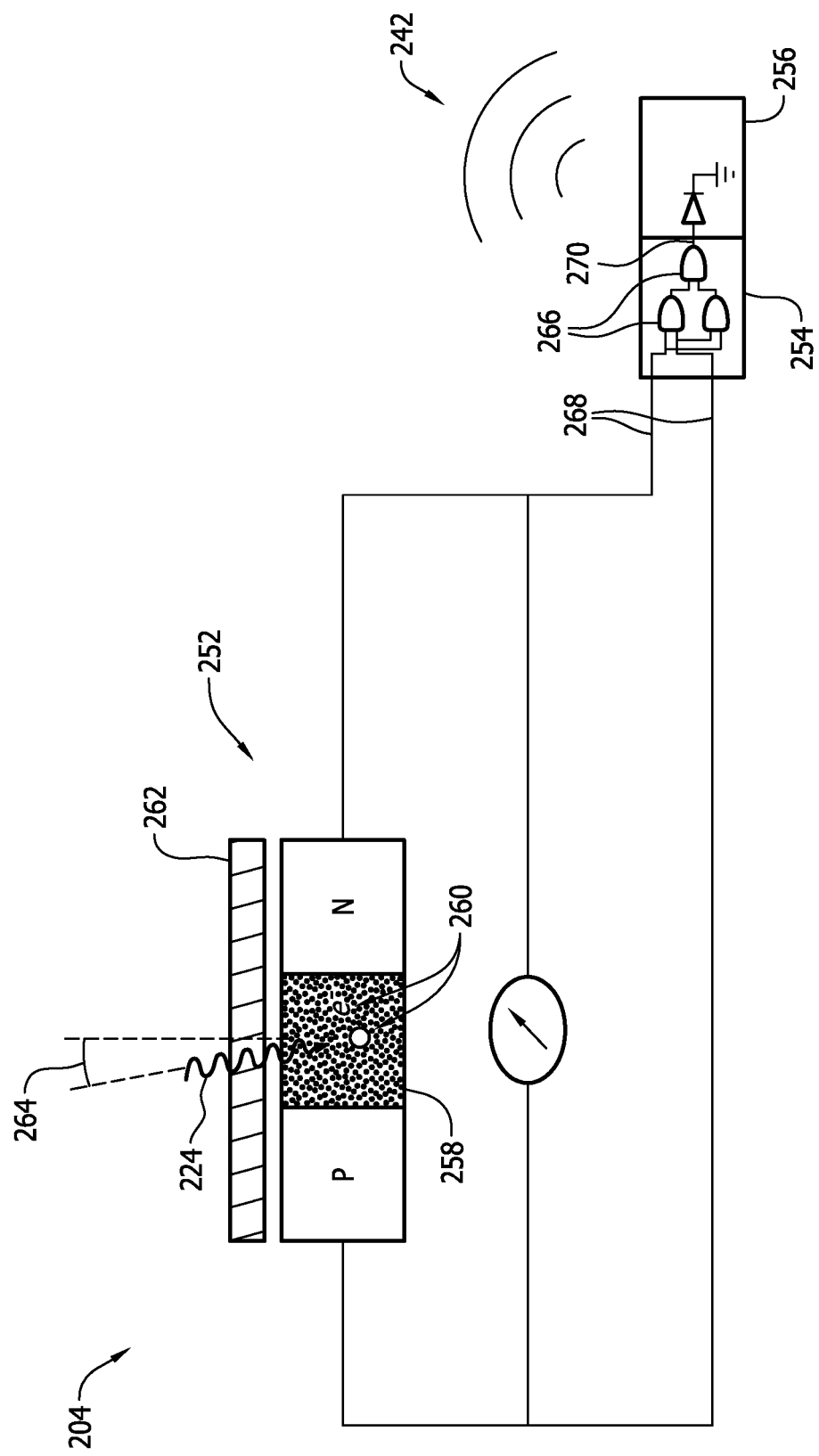
FIG. 6 is a schematic illustration of an exemplary radio-frequency identification tag that may be used with the authentication system shown in FIG. 3.

FIG. 6 is a schematic illustration of RFID tag 204 that may be used with authentication system 200 (shown in FIG. 3). As described above, impinging RFID tag 204 with backscatter x-ray beams 224 causes RF signal 242 to be emitted therefrom. In the exemplary implementation, RFID tag 204 includes a backscatter x-ray receptor 252, an x-ray decoder 254 coupled in communication with backscatter x-ray receptor 252, and a radio-frequency emitter 256 coupled in communication with x-ray decoder 254. Backscatter x-ray receptor 252 includes a semiconductor 258 that facilitates powering RFID tag 204 when impinged by backscatter x-ray beams 224. Specifically, impinging backscatter x-ray receptor 252 with backscatter x-ray beams 224 facilitates forming an electron hole pair 260, which is then utilized to power RF emitter 256.

In some implementations, RFID tag 204 includes a collimator 262 positioned adjacent semiconductor 258. Collimator 262 facilitates restricting backscatter x-ray beams 224 directed towards collimator 262 and/or object 206 at penetration angles other than a predetermined penetration angle 264 from reaching semiconductor 258. As such, collimator 262 only allows backscatter x-ray beams 224 discharged from imaging analysis subsystem 208 (shown in FIG. 4) at predetermined penetration angle 264 to pass therethrough and impinge semiconductor 258. As described above, predetermined penetration angle 264 is selected based on information received from a third party (not shown), such as a manufacturer of object 206. In an alternative implementation, collimator 262 may allow backscatter x-ray beams 224 discharged at a predetermined range of penetration angles to pass therethrough.

X-ray decoder 254 includes at least one logic circuit 266 that facilitates determining whether characteristics (i.e., current flow, energy level, velocity, and/or penetration angle) of backscatter x-ray beams 224 received by x-ray receptor 252 match the predetermined characteristics that enable actuation of RFID tag 204. More specifically, logic circuits 266 receive one or more logical inputs 268 corresponding to the characteristics of backscatter x-ray beams 224, and generate a logical output 270 when the characteristics substantially align with the predetermined characteristics. Logical output 270 then facilitates actuating RF emitter 256 such that RF signal 242 is emitted therefrom. In an alternative implementation, the characteristics of backscatter x-ray beams 224 are decoded using any suitable mechanism that enables RFID tag 204 to function as described herein.

Figure 7:
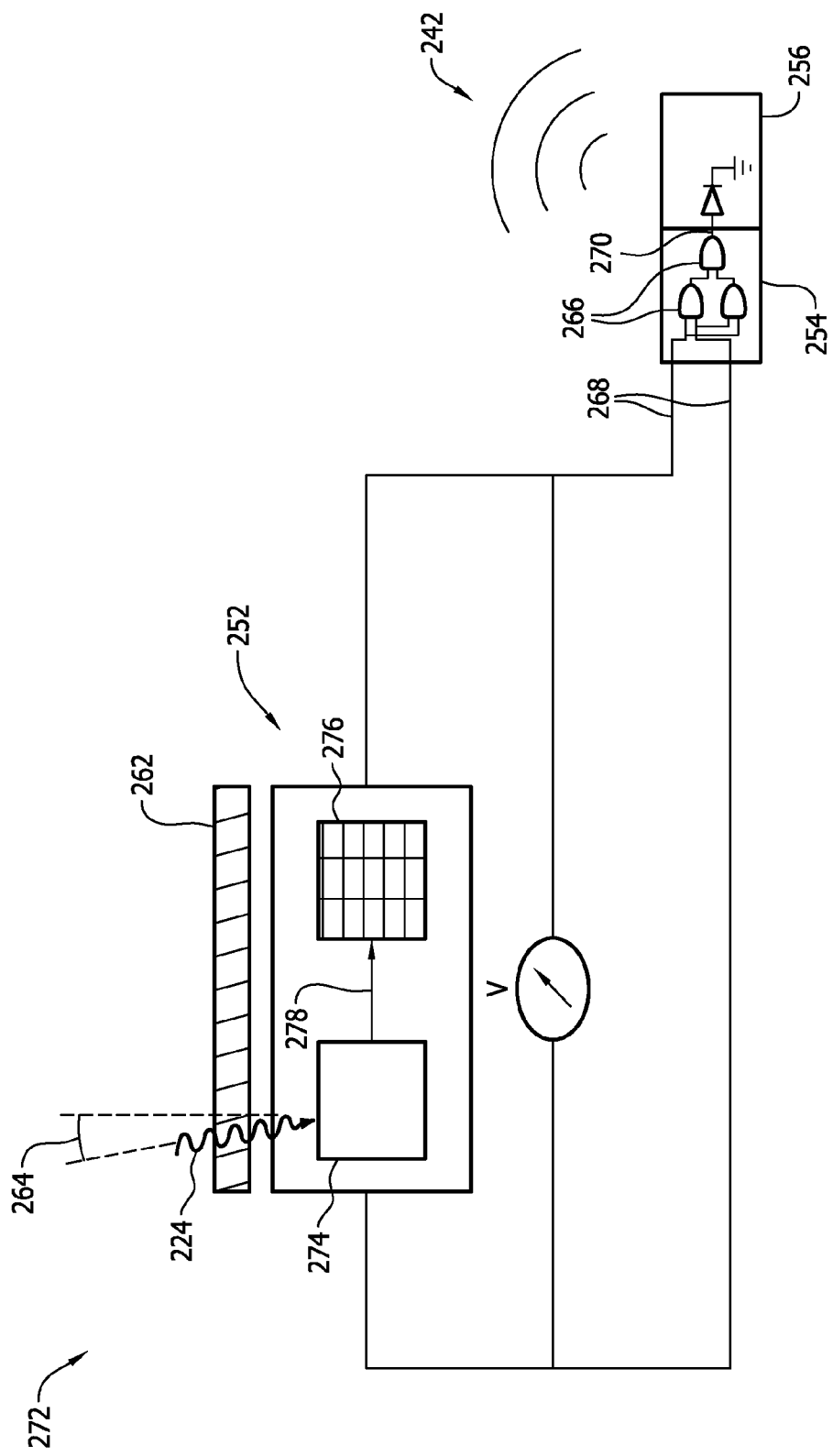
FIG. 7 is a schematic illustration of an alternative radio-frequency identification tag that may be used with the authentication system shown in FIG. 3.

FIG. 7 is a schematic illustration of an alternative RFID tag 272 that may be used with authentication system 200 (shown in FIG. 3). In the exemplary implementation, RFID tag 272 includes backscatter x-ray receptor 252, which includes a second scintillator 274 and a solar cell 276. After backscatter x-ray beams 224 pass through collimator 262, second scintillator 274 receives backscatter x-ray beams 224 and converts energy therefrom into a visible light beam 278. Visible light beam 278 is then directed towards solar cell 276, and energy generated by solar cell 276 is used to power RF emitter 256. In an alternative implementation, backscatter x-ray receptor 252 includes only solar cell 276 to be powered directly by x-ray beams 224.

The implementations described herein relate to systems and methods of authenticating objects in a supply chain. The systems and methods implement a multi-faceted security system to ensure counterfeit objects are identified and removed from the supply chain before being put into service. Specifically, the systems include backscatter x-ray actuated radio-frequency identification tags that are implemented in conjunction with a variety of techniques for obtaining and comparing multiple sources of identifying information for an object to facilitate authenticating the object. The security system is configured such that the multiple sources of identifying information can only be obtained by entities privy to certain identifying information and/or privy to information required to obtain the identifying information. As such, the systems and methods describes herein facilitate secure, fast, and efficient analysis of objects to determine their authenticity.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in authenticating an object, said system comprising:
   a radio-frequency identification tag coupled to the object;
   an interrogation system comprising:
      a backscatter x-ray source configured to discharge backscatter x-ray beams towards the object, said backscatter x-ray source calibrated such that the backscatter x-ray beams having predetermined characteristics to simultaneously (1) cause the radio-frequency identification tag to emit a signal that includes an encoded portion that contains a first identifying information and (2) cause the backscatter x-ray beams to reflect off of the object to form an image;
      a radio-frequency detector configured to receive the signal from the radio-frequency identification tag; and
      a computing device in communication with said radio-frequency detector, said computing device configured to:
         decode the encoded portion of the signal to obtain the first identifying information;
         form the image of the object from the backscatter x-ray beams reflected from the object;
         obtain second identifying information of the object from the image;
         compare the first identifying information to the second identifying information to authenticate the object; and
         designate the object as counterfeit if the object is not authenticated.

2. The system in accordance with claim 1, wherein said backscatter x-ray source calibrated such that the backscatter x-ray beams having predetermined characteristics include at least one of a predetermined current flow, a predetermined beam energy level, a predetermined beam velocity, or a predetermined beam penetration angle towards the object.

3. The system in accordance with claim 1, wherein said backscatter x-ray source is calibrated using predetermined settings selected based on information not stored within said interrogation system.

4. The system in accordance with claim 1, wherein said computing device is further configured to:
  obtain third identifying information of the object from look-up data; and
  compare the first identifying information to the third identifying information to authenticate the object.

5. A system for use in interrogating a radio-frequency identification tag coupled to an object, said system comprising:
  a backscatter x-ray source configured to discharge backscatter x-ray beams towards the object, said backscatter x-ray source calibrated such that the backscatter x-ray beams having predetermined characteristics to simultaneously (1) cause the radio-frequency identification tag to emit a signal that includes an encoded portion that contains a first identifying information and (2) cause the backscatter x-ray beams to reflect off of the object to form an image;
  a radio-frequency detector configured to receive the signal from the radio-frequency identification tag; and
  a computing device in communication with said radio-frequency detector, said computing device configured to:
    decode the encoded portion of the signal to obtain the first identifying information;
    form the image of the object from the backscatter x-ray beams reflected from the object;
    obtain second identifying information of the object from the image;
    compare the first identifying information to the second identifying information to authenticate the object; and
    designate the object as counterfeit if the object is not authenticated.

6. The system in accordance with claim 5, wherein said backscatter x-ray source calibrated such that the backscatter x-ray beams having predetermined characteristics include at least one of a predetermined current flow, a predetermined beam energy level, a predetermined beam velocity, or a predetermined beam penetration angle towards the object.

7. The system in accordance with claim 5, wherein said backscatter x-ray source is calibrated using predetermined settings selected based on information not stored within the system.

8. The system in accordance with claim 5, wherein said computing device is further configured to:
  obtain third identifying information of the object from look-up data; and
  compare the first identifying information to the third identifying information to authenticate the object.

9. A method of authenticating an object having a radio-frequency identification tag coupled thereto, said method comprising:
  discharging backscatter x-ray beams towards the object, wherein the backscatter x-ray beams having predetermined characteristics that simultaneously (1) cause the radio-frequency identification tag to emit a signal that includes an encoded portion that contains a first identifying information and (2) cause the backscatter x-ray beams to reflect off of the object to form an image;
  receiving the signal from the radio-frequency identification tag;
  obtaining first identifying information for the object from the signal by decoding the encoded portion of the signal;
  forming the image of the object from backscatter x-ray beams reflected from the object;
  obtaining second identifying information of the object from the image; and
  comparing the first identifying information to the second identifying information to authenticate the object; and
  designating the object as counterfeit if object is not authenticated.

10. The method in accordance with claim 9, wherein discharging backscatter x-ray beams comprises selecting the predetermined characteristics based on information received from a secure location.

11. The method in accordance with claim 9, wherein authenticating the object comprises:
  obtaining third identifying information of the object from look-up data; and
  comparing the first identifying information to the third identifying information to authenticate the object.

12. A radio-frequency identification tag configured to couple to an object, said radio-frequency identification tag comprising:
  an x-ray receptor configured to receive backscatter x-ray beams having predetermined characteristics that facilitate powering the radio-frequency identification tag and comprising:
    a scintillator configured to emit a beam of visible light when impinged by the backscatter x-ray beams having predetermined characteristics; and
    a solar cell configured to convert the beam of visible light into usable energy; and
  a radio-frequency emitter coupled in communication with said x-ray receptor, wherein said radio-frequency emitter is configured to emit a signal associated with the object when said x-ray receptor receives the backscatter x-ray beams having predetermined characteristics and is powered solely using the usable energy from said solar cell.

13. The radio-frequency identification tag in accordance with claim 12, wherein said x-ray receptor comprises a semiconductor.

14. The radio-frequency identification tag in accordance with claim 12 further comprising a collimator configured to restrict backscatter x-ray beams directed at angles other than a predetermined penetration angle from reaching said x-ray receptor.

15. The radio-frequency identification tag in accordance with claim 12 further comprising a decoder configured to receive inputs corresponding to characteristics of the backscatter x-ray beams having predetermined characteristics, wherein said decoder facilitates actuating said radio-frequency emitter when the characteristics substantially align with the predetermined characteristics.

16. The radio-frequency identification tag in accordance with claim 15, wherein said decoder comprises at least one logic circuit configured to generate a logical output that facilitates actuating said radio-frequency emitter when the characteristics substantially align with the predetermined characteristics.

* * * * *